Jan. 3, 1950   G. SOCHIA   2,493,039
DEBURRING TOOL
Filed Jan. 29, 1947
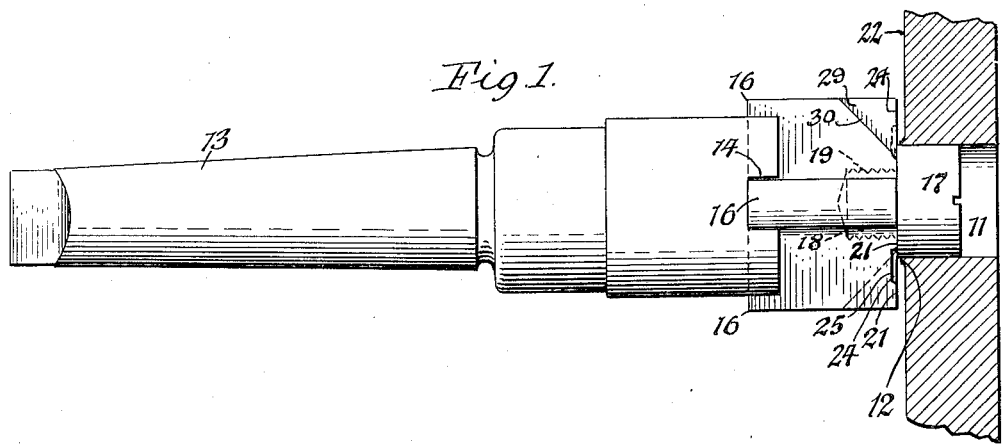
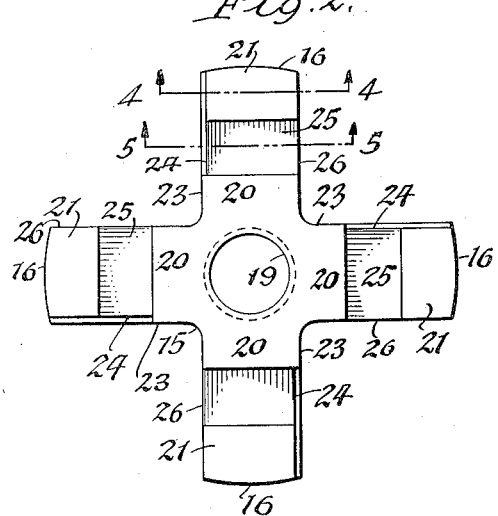
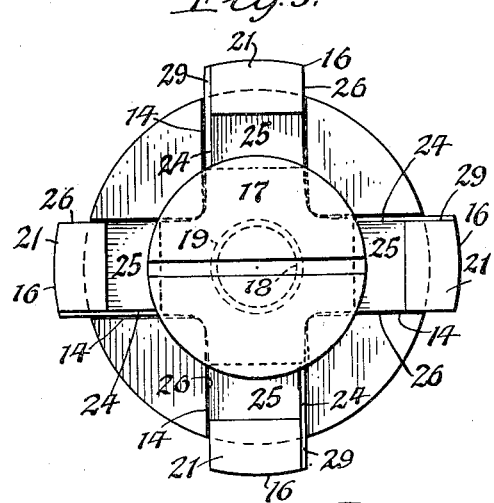
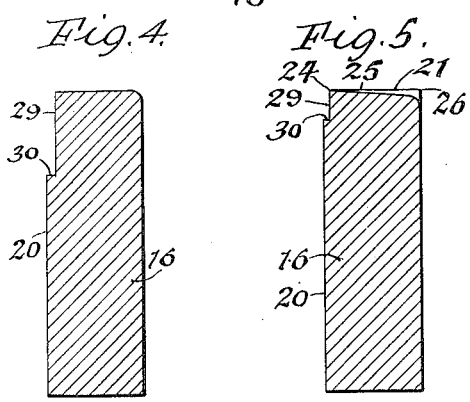
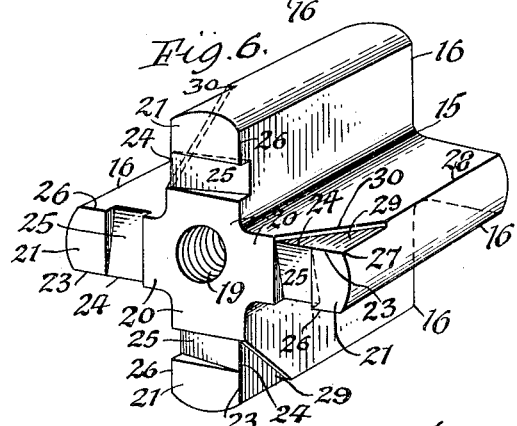
George Sochia Inventor
by Pope & Pope Attorneys Patented Jan. 3, 1950

2,493,039

UNITED STATES PATENT OFFICE 2,493,039

DEBURRING TOOL

George Sochia, Baldwinsville, N. Y., assignor to Morris Machine Works, Baldwinsville, N. Y., a corporation of New York Application January 29, 1947, Serial No. 724,940

1 Claim. (Cl. 29—105)

This invention relates to a deburring tool whereby burrs may be removed from the face of articles around openings or holes which have been formed therein by a drill press or similar machine.

In the finished condition of a pair of flanges for use in connecting the sections of the conduit of a double suction pump, as an example of one use of this invention, it is necessary for the two flanges to be assembled so that they butt tightly against each other and this can only be accomplished when no burrs are present on the faces of these flanges around the opening in the game. The normal or usual procedure of preparing such flanges is to face each flange by means of a facing head or similar operation and then form the bolt holes in the same by means of a drill press. In drilling these holes a burr is usually raised on the face or front side of the same where the drill enters the workpiece in the operation of forming the holes. After the required number of holes have been drilled in the flange the burrs around the drill holes are usually removed by a hand operated tool so that when the two similar flanges are placed together they will fit flush against each other.

It is the object of this invention to provide a deburring tool whereby this hand operation becomes unnecessary and removal of the burrs may be effected by machine operation and thereby expedite this work and enable the same to be done more economically.

In the accompanying drawings:

Fig. 1 is a side elevation of a deburring tool embodying this invention and showing the manner in which the same is applied to the workpiece which is to be deburred and operated by the tool holder of a drill press.

Fig. 2 is a view of this deburring tool viewed from its front but omitting the pilot means whereby the same is retained in its central position relative to the hole in the workpiece which is to be deburred.

Fig. 3 is a similar view showing this tool provided with a pilot plug for centering the same relative to the opening in the workpiece which is to be deburred and also showing the tool mounted on a tool holder.

Figs. 4 and 5 are sections of one of the wings of the deburring tool taken, respectively, on lines 4—4 and 5—5, Fig. 2, looking radially outward.

Fig. 6 is a perspective view of the deburring tool embodying this invention with the pilot plug and the tool holder removed therefrom.

The workpiece upon which a deburring operation is to be performed may be of any suitable character and for the present it will be assumed that this workpiece consists of a flange for use as part of a coupling for connecting two tubular members of a pump or like structure. In Figure 1, the body of this flange has the form of a plate 10 and in this body a tranverse cylindrical hole or opening 11 has been formed by a rotary drill or otherwise. During such drilling operation some of the metal of this body is raised on the face of the body in the form of an annular burr 12 around the front end of said opening.

The tool for removing this burr may be rotated while in engagement with the workpiece in any suitable manner but preferably by means of a tool holder similar to that now in common use for tools of this general character and comprising a longitudinal Morse tapered shank or spindle 13 which is mounted for rotation in a drill press in the usual manner and provided at its front end with a socket consisting preferably of four grooves or slots 14 arranged in the form of a right angled cross and extending rearwardly from the front end of the shank and also radially outward from the axis of the same.

In its general organization the deburring tool embodying this invention comprises a central longitudinal head, hub or body 15, and four longitudinal wings 16 arranged to form a right angled cross and projecting radially outward from the body or hub of the tool. The head or body of this tool is mounted on the driving shank or spindle so as to be compelled to rotate with the same by engaging the rear ends of the several wings 16 with the radial slots or grooves 14 of the driving spindle.

The tool is maintained in axial alinement with the opening in the workpiece which is to be deburred by pilot means which preferably comprise a cylindrical pilot plug 17 which is adapted to fit in the opening 11 of the workpiece and to rotate as well as move lengthwise therein. The diameter of this pilot plug corresponds to the diameter of the hole in the workpiece intended to receive the same and as it is necessary to select pilot plugs of the required diameter the same are made separate from the tool body and are detachably connected therewith by means of an externally threaded screw stem 18 which projects from the outer or rear end of the pilot plug and engages with an internally screw threaded opening 19 formed axially in the front end portion of the tool body or hub.

Each of the wings of this tool is constructed as follows for the purpose of accomplishing the purposes of this invention:

The tool is provided with a stop surface which extends in the same plane across the entire front end of the hub and wings of the tool at right angles to the longitudinal axis of the same so as to form an inner stop face 20 on the hub or body and the inner parts of the wings of the tool which is engaged by the rear side of the pilot plug, and a plurality of outer stop faces 21 on the outer parts of the front ends of the wings and are adapted to engage with the front side or face 22 of the workpiece for limiting the movement of the tool toward the workpiece and arresting the cutting operation of this tool when the annular burr 12 around the opening in the workpiece has been completely removed from the latter and the front side of the workpiece is entirely even or flush.

On the advancing corner 23 at the front end of each of the wings the same is provided between the inner and outer stop faces 20, 21 thereon with a laterally extending cutting edge 24 which is adapted to engage with the annular burr on the workpiece and remove the same therefrom. The width of this cutting edge is determined by the width of the burr which is to be removed so that it will extend across any part of this burr during the operation of removing the same from the workpiece.

Each of the cutting edges 24 is arranged in line with the plane of the stop faces 20 and 21 of the front ends of the body and wings of the tool.

On its front end each wing of the cutter head is provided with an inclined or receding relief surface 25 which extends circumferentially backward from the cutting edge 24 on the advancing corner of the respective end of this wing to the corresponding trailing corner 26 of the same, thereby relieving the frictional contact between the wing and the burr which is being cut and avoiding undue heating and wear of the same which otherwise would occur.

On the advancing side of each wing adjacent to the angle 27 between the transverse front corner 23 and the corresponding longitudinal corner 28 thereof the same is provided with a cutter extension face 29 which is arranged in a plane parallel with the axis of rotation of the tool and preferably extends from the cutting edge 24 diagonally across the advancing longitudinal side of the respective wing to the longitudinal corner 28 thereof, this cutter extension surface being preferably formed by grinding this part of the wing and leaving an inclined inner wall or shoulder on this wing, as shown at 30.

When using this tool for removing a burr from a workpiece of the character described, the pilot plug 17 is first inserted in the drilled hole 11 of the workpiece from the front end thereof and then the tool is rotated and forced with its front end toward the front face of the workpiece. As the cutting edge 24 of each wing engages the burr on the workpiece the burr is gradually cut off and when this burr is completely removed the stop surfaces 21 at the front ends of the wings engage the front face of the workpiece. By these means a front face 22 is produced on the workpiece which is perfectly flat and in the same plane over the entire area of the workpiece around the respective hole.

When the cutting edges of the wings have become worn the same way be resharpened by grinding off the front end of the body and wings of the tool to the same plane and also deepening the inclined relief surfaces adjacent to each cutting edge accordingly. During this sharpening operation the pilot plug is removed from the body of the tool and after such sharpening the pilot plug is again screwed onto the tool body until its rear side engages the inner parts 20 of the stop surface on the front end of the tool body and wings.

It will be noted that in the assembled cutter head and pilot plug the periphery of the plug overlaps the inner ends of the cutting edges 24 of the wings, thereby insuring complete removal of the burr from the face of the workpiece around the hole therein.

This tool is very simple and inexpensive in construction and can be readily maintained in the most efficient condition. Moreover, the same permits of easily and rapidly removing burrs from the workpiece and thus reduce the cost of doing such work as compared with the means heretofore employed for this purpose.

I claim as my invention:

A tool for removing burrs from the face of an article around a hole therein, comprising a head adapted to be rotated about an axis concentric with said hole and provided with a radially projecting wing adapted to be arranged in front of said face, said wing being provided on its end opposing said face with a radially extending cutting edge adapted to remove said burr from said article, a relief face arranged on the end of said wing opposing said face of said article and receding circumferentially backward from said cutting edge, and inner and outer stop faces arranged on the end of said wing opposing said face of said article in line with said cutting edge and adjacent to the inner and outer ends of said cutting edge, and a pilot plug detachably mounted on the end of said body opposing said face of said article and overlapping the inner part of said cutting edge and adapted to enter the hole in said article from which the burr is to be removed, said inner stop face adapted to be engaged and covered by said pilot plug and said outer stop face adapted to engage the said opposing face of said article.

GEORGE SOCHIA.

REFERENCES CITED

The following references are of record in the file of this patent:

UNITED STATES PATENTS

| Number | Name | Date |
| --- | --- | --- |
| 1,413,920 | Lewis | Apr. 25, 1922 |
| 2,253,905 | Knobel | Aug. 26, 1941 |
| 2,374,761 | Lusa | May 1, 1945 |

FOREIGN PATENTS

| Number | Country | Date |
| --- | --- | --- |
| 203,866 | Great Britain | Sept. 20, 1923 |